No. 874,508.  
PATENTED DEC. 24, 1907.

M. G. HUBBARD, Jr.  
BRAKE FOR ELECTRIC CARS.  
APPLICATION FILED NOV. 18, 1896.

WITNESSES

INVENTOR

No. 874,508.
PATENTED DEC. 24, 1907.
M. G. HUBBARD, Jr.
BRAKE FOR ELECTRIC CARS.
APPLICATION FILED NOV. 18, 1896.

WITNESSES
Thomas W. Bakewell
T. A. Connor

INVENTOR
M. G. Hubbard Jr.

No. 874,508. PATENTED DEC. 24, 1907.
M. G. HUBBARD, Jr.
BRAKE FOR ELECTRIC CARS.
APPLICATION FILED NOV. 18, 1896.

WITNESSES

INVENTOR

UNITED STATES PATENT OFFICE.

MOSES G. HUBBARD, JR., OF AUSTIN, ILLINOIS.

BRAKE FOR ELECTRIC CARS.

No. 874,508.   Specification of Letters Patent.   Patented Dec. 24, 1907.

Application filed November 18, 1896. Serial No. 612,560.

*To all whom it may concern:*

Be it known that I, MOSES G. HUBBARD, Jr., of Austin, in the county of Cook and State of Illinois, have invented a new and useful Improvement in Brakes for Electric Cars, of which the following is a full, clear, and exact description, reference being had to the accompanying drawings, forming part of this specification, in which—

Fig. 3 is a side elevation of the brake-operating magnet in released position.

In braking cars it will be found that the co-efficient of friction or adhesion between the wheels and rails is constant at all speeds, so long as the wheels do not slip, but the co-efficient of friction between the rubbing surfaces used to retard the rotation of the wheels and the consequent forward movement of the car decreases as the speed of the wheels increases. Therefore, the greatest pressure should be coincident with the greatest speed and should decrease as the speed of the wheels decreases, because the co-efficient of friction increases as the speed of the wheels decreases. This, however, is not all that is necessary, for if the power of the brake is reduced directly in proportion to the reduction in speed of the wheels, when the wheels cease to revolve there will be no power acting to retard the motion of the car; and the car could not be stopped on a grade nor held when stopped on a level track. Therefore, while the power applied to the brake should be reduced as the speed of the wheels is reduced, such reduction should be in a less ratio, at least at the latter period of the car's motion, so that when the wheels stop there shall be sufficient power still acting upon the brakes to hold the car under all conditions. By proportioning this reduction of power applied to the brakes so that when the wheels stop rotating it shall be a little less than would be required to lock the wheels and to cause them to slide under the worst conditions of road, the maximum retarding effect desirable to be obtained is secured.

All these desirable conditions are obtained in my improved apparatus, in which there is a controlling device located within convenient reach of the operator or driver, by which he is enabled to slacken the speed without stopping the car or to stop gradually or quickly as the occasion may demand.

I also provide the car with a power generator arranged so that the power developed will vary with the speed with which it is driven, and I connect it with and drive it from the car-axles or wheels.

It is well known that with proper changes in connection an electric motor can be converted into an electric generator; I, therefore, use the ordinary car-motors of electric cars for generating the power required to operate the brakes, and I interpose in the circuit between the motor and its controller a brake-controller arranged so that when in its normal position it will not interrupt the main motor-circuit, but that when moved, say to its first notch and beyond the same, the motor is cut out of circuit from its controller and from the line-circuit leading from the generator at the central station, and the motor-terminals are reversed at the same time and are put into circuit with the braking-apparatus, so that it shall immediately act as a generator and produce an electric current, whose voltage will diminish with the speed of the wheels of the car. Suitable resistance must be provided for such brake-circuit in order to provide for varying the power applied to the brakes and to make it possible to stop slowly or quickly as desired, the brake-controller being arranged so that more or less of this resistance can be included in the circuit by moving the controller-handle from one notch to the other. The ordinary resistance boxes of the motor circuit can be used, but I prefer to use separate resistance boxes, as in that way I can be certain of having the steps of the different reductions of resistance correspond to the requirements of the brake-mechanism.

In running the car under ordinary circumstances, the motorman will throw off the motor-controller before operating the brake-controller, but in order to provide for quick action in cases of emergency I construct the brake-controller so that when first put into operation it will at once disconnect the motor-controller and line-current from the motor.

In the use of some types of motors, when their terminals are reversed and when they are thus transformed into electrical generators, they will not build up current with sufficient rapidity for my purposes when the circuit includes the resistance-coils and the brake-magnet or brake-motor, and I, therefore, prefer to introduce into the circuit an automatically operated cut-out switch, which in its normal position cuts out of the brake-circuit the brake-motor and all the resistance-coils or a large part thereof, so that when the current is first generated by the motor-generator and traverses the brake circuit the generator will build up very rapidly, but as soon as the generator builds up sufficiently to operate the magnet of the switch, the switch will be moved so as to throw into the circuit the resistance-coils and the brake-magnet. This momentary absence of the resistance-coils from the circuit will not endanger the safety of the generator, and by the use of the automatic switch I am enabled to remove any uncertainty of the motor starting to generate sufficient current to operate the brake.

In order that when the current from the motor-generator is reduced by the slacking of the speed of the car to such a point that it would not be of itself sufficient to operate the brakes, I provide the brake-mechanism with an air-cushion device which, when the pressure exerted by the brake-magnet ceases, will still hold the brake-mechanism to its work, allowing it to yield only sufficiently to compress the air. The brakes will thus be retained in set-position until by suitable releasing mechanism the valve of the air cushioning device is opened and the air allowed to escape. I prefer to form the air-cushion in a cylinder containing a piston which is of shorter travel than the length of the cylinder, so that there shall be an air-space back of it when it is at rest, and I render the air-space variable in cubical size by means of a suitably adjustable plug. This cylinder is connected with an oil-reservoir, whose purpose and arrangement I will explain in detail hereinafter.

In order that I may bring the car to a full stop when it is running at such slow rate of speed that the motor would be insufficient to generate the necessary current, I provide a switch mechanism for connecting the line current with the brake-operating magnet, the automatic cut-out switch above described being preferably also interposed in this circuit, so that the line-circuit shall be broken when the said cut-out switch is in working position and there is sufficient current given by the motor-generator to operate the brake-magnet.

The magnet which I prefer to use for operating the brake has two hollow-center magnet-spools mounted in a non-magnetic frame which hold them in the desired fixed relation to each other, and at each end there is a magnetic armature, both of which armatures may be movable or one fixed and the other movable. The movable armature has two legs or cores constructed to enter the hollow spools, and long enough to come into contact or nearly into contact with the fixed armature at the other end. The consequence is that in operation of the magnet the cores of the armature are drawn into the spools with increasing power during their inward motion. This gives a magnet of desirable construction because of its high efficiency and because it affords a complete magnetic circuit. In this it is different both from an ordinary electro-magnet, and from an ordinary solenoid. The ordinary electro-magnet is only efficient when the armature is close to the poles, and the range of its movement is too limited for practical use in an electrical brake. In an ordinary solenoid, there is a sufficiently long movement of the armature, but its action is inefficient. Instead of the magnet, I may use any suitable type of electro-magnetic motor for operating the brake.

Referring now to the drawings, 2 represents the motor of the car, having an armature A and field F, F.

$A'$, $A^2$ are conductors extending from the armature brushes, and $F'$, $F^2$ are the conductors in circuit with the field. These conductors extend to suitable contacts $a'$, $a^2$ and $f'$, $f^2$ on the switchboard of the brake-controller 3.

Figures 7, 8, 9:
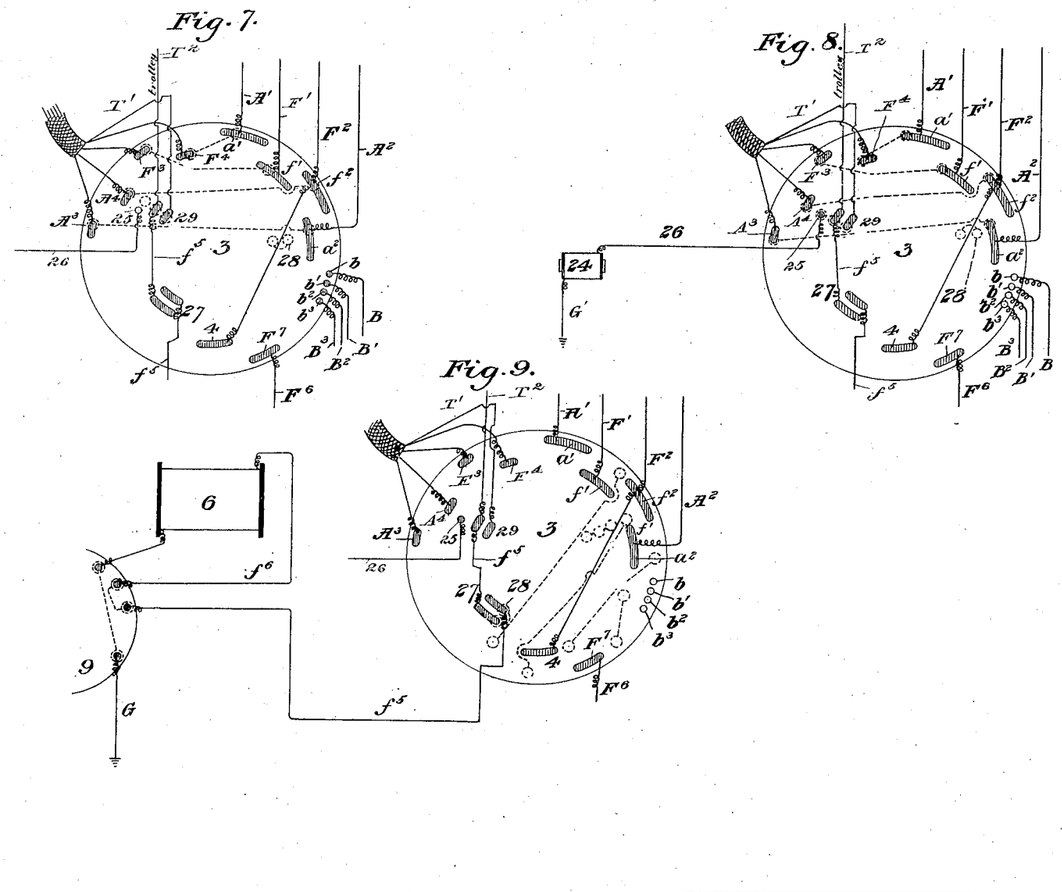
Fig. 7 shows in diagram the controller of the brake-mechanism in the position which it occupies when the motor is driving the car and when the brake-apparatus is not used.
Fig. 8 shows the same when put in proper position to operate the release-magnet.
Fig. 9 shows the same when connecting the line circuit with the brake-magnet.

$A^3$, $A^4$ and $F^3$, $F^4$ are the conductors leading from the controller (not shown), by which the operation of the car-motor is controlled, and when the braking mechanism is off, the brake-controller 3 is in the position shown in Fig. 7, so that the terminals $A^3$, $A^4$, $F^3$, $F^4$ are connected with the terminals $a^2$, $f^2$, $f'$, $a'$ respectively, thus closing the circuit between the motor-controller and the car-motor and enabling the motor to be started and controlled in the usual way. When the disk of the brake-controller 3 is moved into the position shown in Fig. 5, it at once interrupts the circuit between the terminals of the conductors leading from the motor controller and the terminals $a'$, $a^2$, $f'$, $f^2$, and establishes electrical connection between the contacts $a'$ and $f^2$ by means of an intermediate contact 4; connects the contact $f'$ with the contact $F^7$ of the brake circuit, and connects the contact $a^2$ with one of several contacts $b$, $b'$, $b^2$, $b^3$.

6 is a magnet or electric motor by which power is applied to the brake, and the preferable construction of which I shall describe later.

R, R', R² are the resistance-coils of the motor-circuit, which as before explained, I utilize also for the brake-circuit.

7 is a magnet, whose armature operates a lever 8 to turn a disk 9 forming the moving part of an automatic cut-out switch. The reverse motion of the lever 8 and of the disk 9 is secured by a spring 10. A conductor B leads from the contact $b$ and divides, part passing to the switch 9 and part to the resistance-box at the first coil R² of the series.

$F^5$ is a conductor leading from the contact $F^7$ to a contact on the switch 9. The magnet 7 is also in circuit with contacts on said switch, and by one of them it is permanently connected with a conductor R³ leading to the last of the several resistance-coils.

B', B² and B³ are conductors leading respectively from the contacts $b'$, $b^2$, $b^3$ to the resistance-coils R', R, and conductor R³.

$F^6$ is a conductor connecting the brake-magnet 6 with the conductor $F^5$. M', M² are conductors connecting said magnet with the switch 9 as shown, and G is a conductor leading from the switch to ground and adapted to be connected with the conductor M² when the switch is in the position of Fig. 5.

Figure 1:
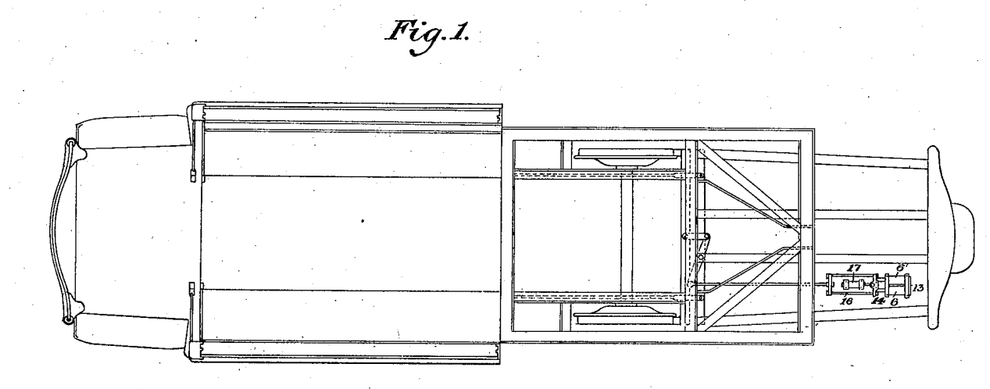
Figure 1 is a top plan view, showing my improved brake as applied to a car.
Figure 2:
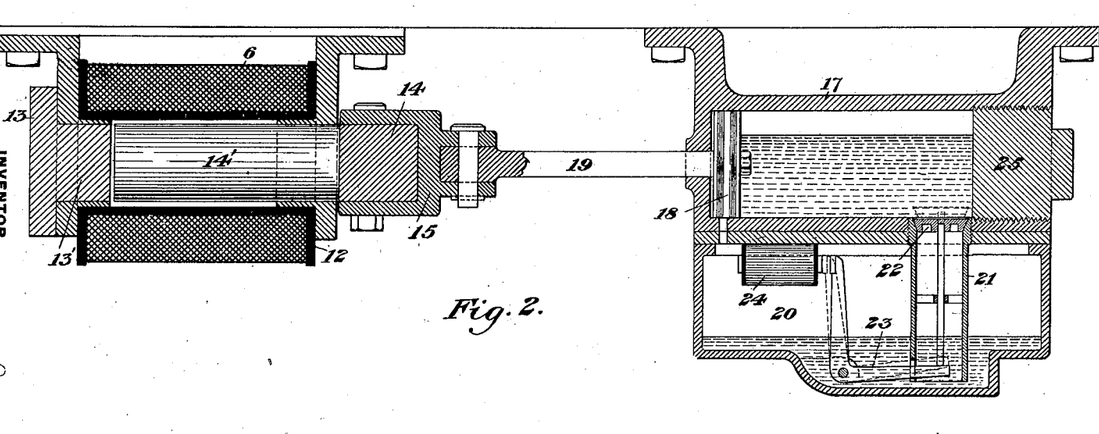
Fig. 2 is a vertical longitudinal section of the brake-operating magnet and its connections, showing the same when exerting pressure against the brake-shoes.
Figures 4, 5:
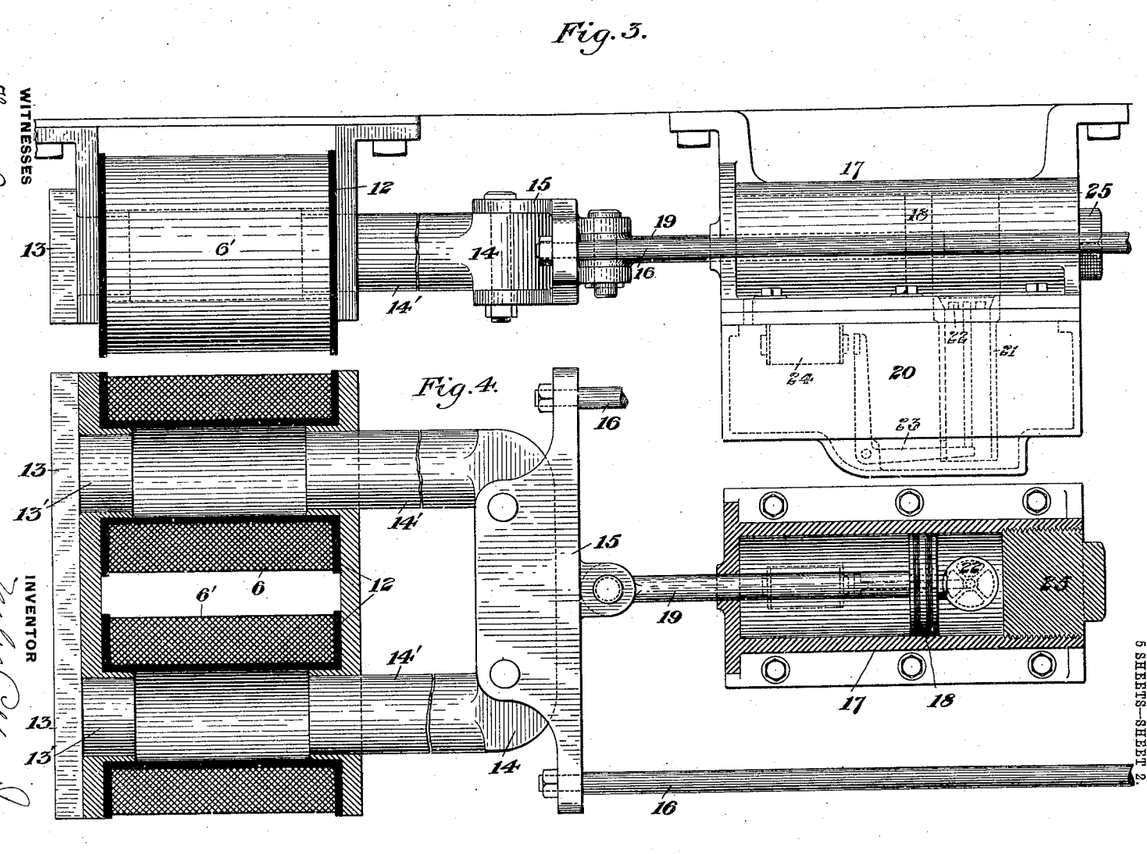
Fig. 4 is a horizontal section thereof.
Fig. 5 is a diagram view of the electric circuits, showing the same when the brake-controller or rheostat has been turned so as to put the motor of the car in circuit with the brake-operating apparatus and to disconnect the motor from the motor-controller, but before such change has continued a sufficient time to operate the automatic cut-off switch.
Figure 5:
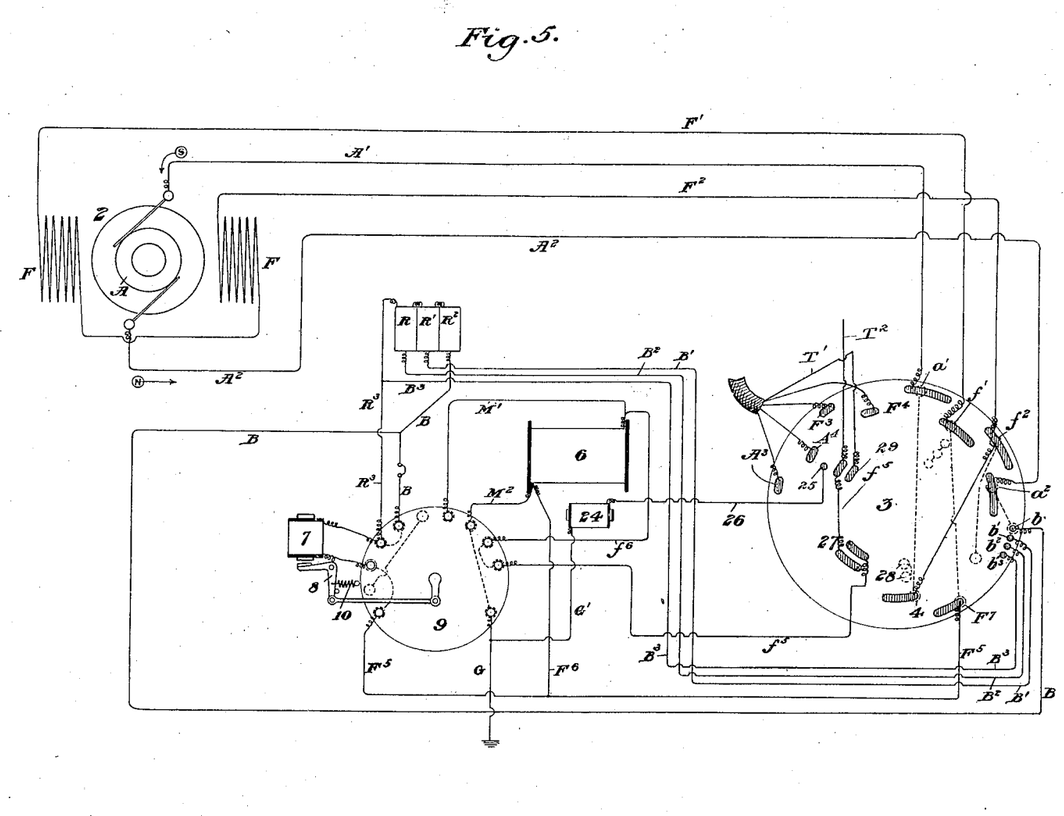
Figure 6:
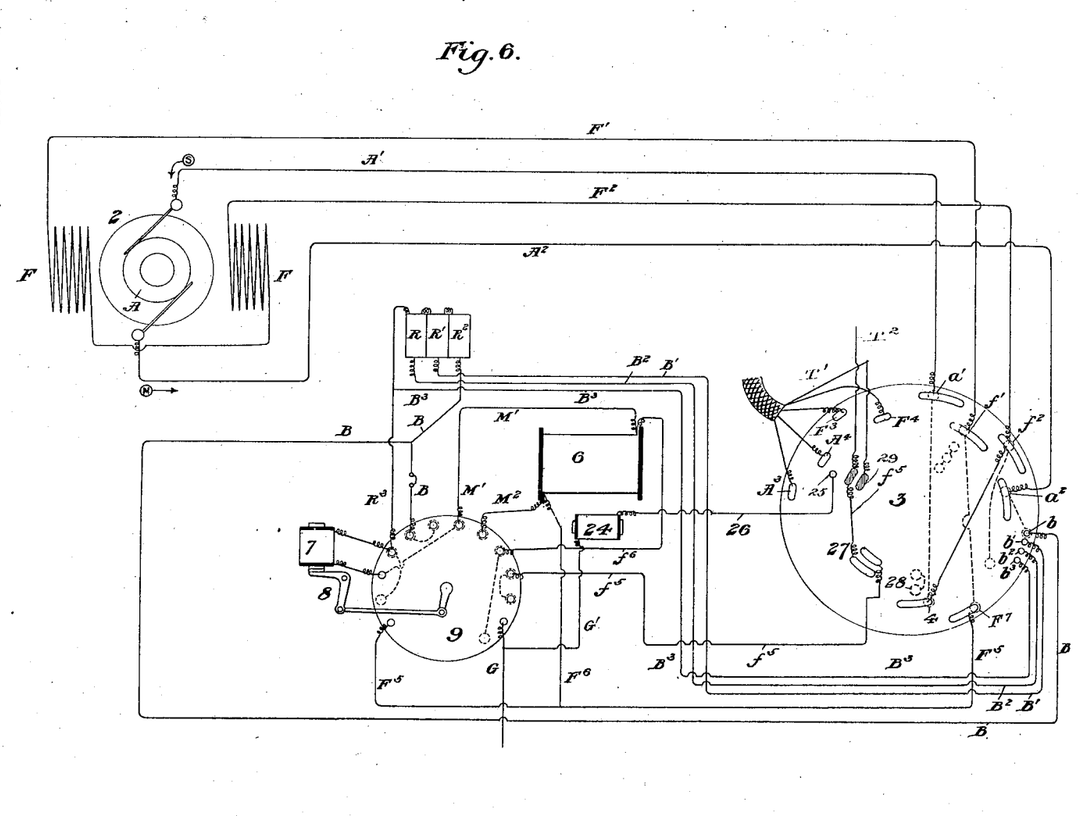
Fig. 6 is a similar view, showing the parts after the automatic switch has moved so as to include the resistance coils in the circuit with the motor and brake-magnet.

In order to put the braking apparatus into action, the controller 3 is moved into the position shown in Fig. 5, and thereupon, as above explained, the motor is cut out of circuit from the line-conductors and is put into circuit with the brake-operating mechanism, thus causing the motor to act as a generator of current for operating the brake. A current from the motor-generator 2 then traverses the conductor A², conductor B and (without passing through the resistance-coils) passes through the magnet 7 and conductor $F^5$ to the conductor $F'$, thence completing the circuit through the conductors $F^2$ and A', by way of the contact 4. This current although not traversing the resistance-coils, being momentary will not injuriously affect the motor-generator, but will cause it to build up. When sufficient current is generated thereby to energize the magnet 7, the motion of its armature will move the disk of the switch 9 into the position shown in Fig. 6, so as to interrupt the direct connection between the conductor B and the magnet 7 and to cause the current traversing the conductor B to pass through all of the resistance-coils R, R', R², through the conductor R³ through the magnet 7, thence to the conductor M', through the coils of the brake-magnet 6, through the conductor $F^6$ and conductor $F^5$, and thence in the return circuit as above explained. The magnet 6 being thus energized, its armature will move the brake-lever and will press the brake-shoes against the wheels with a force dependent upon the speed at which the car is moving, and upon the amount of resistance which is in the brake-circuit. To increase the power applied to the brakes, the controller 3 is moved so as to connect the contact $a^2$ with the contact $b'$, or $b^2$, thus cutting more resistance out of the circuit, or by moving it so as to connect the contact $a^2$ with the contact $b^3$, the current will pass to the brake-magnet without traversing any of the resistance-coils R, R', R², and a very quick emergency-stop may be produced. The course of the current in such cases can be traced readily by reference to Fig. 6. To disconnect the brake mechanism and to connect the car-motor again with the line-circuit and with the car-controller, the disk of the brake-controller is moved back, as will be explained more fully below.

Referring now to the figures on the first and second sheets of the drawings, it will be seen how the brake-mechanism will operate when the motor-generator, by reason of slowing of the car, ceases to generate sufficient power to operate the brake, or when the operator reverses the brake-controller so as to put the brake-magnet out of circuit from the motor-generator.

6, 6 are the spools of the brake-magnet, set parallel to each other and supported by a non-magnetic frame 12. At one end of the magnet is a stationary armature or bar 13 of soft iron, connecting the ends of the spools and preferably having projections or studs 13' extending within the latter.

14 is the movable armature whose legs or cores 14' extend into the spools and which is connected by a cross-head 15 and rods 16 to the brake-lever of the car.

17 is a cylinder having a piston 18 whose rod 19 is connected with the cross-head. Below the cylinder is a chamber 20 containing oil or other liquid, and 21 is a pipe or duct which extends down from the cylinder 17 back of the innermost position of the piston into the oil-chamber, and is provided with a valve 22 seating outwardly relatively to the cylinder, so that the suction created by forward motion of the piston will open it, and having also an opening-lever 23 operated by an electro-magnet 24 which I call the release-magnet. As shown in Figs. 3 and 4, the piston 18 is in its rearmost position, and back of it is an air-space, the size of which is rendered adjustable by a screw-plug 25.

When the current of the motor-generator passes through the coils of the brake-magnet, the cores of the armature 14 are drawn into the spools, and as explained above, the presence of the bar or armature 13 causes them to be drawn thereinto with a constantly increasing force, and much more effectively than if the ordinary solenoids were used. The inward motion of the armature draws on the rods 16, sets the brakes against the wheels of the car and also draws forward the piston 18 within the cylinder 17, thus sucking up into the cylinder through the duct 21 a quantity of oil corresponding to the extent of the piston's advance. As the magnet-spools are gradually demagnetized by the reduction of the power of the current due to the slackening of the speed of the car-wheels, or wholly demagnetized by interruption of the circuit at the brake-controller the release of the pull upon the brake-lever will tend to retract the armature 14, but thereupon the valve 22 immediately closes and the air contained in the space back of the piston forms a spring or cushion which, while permitting the brakes to yield somewhat, still holds and presses them against the wheels until the valve 22 is opened so as to permit the escape of the oil into the reservoir 20 as explained below. The extent of the yielding thus permitted to the brakes depends upon the cubic capacity of the air-space back of the piston. The function of the oil is to render the effective size of the air-cushion always constant, for the indrawn oil, being substantially incompressible, prevents the size of the air cushion being varied by variation in the extent of forward motion of the piston.

As the power of the current decreases more rapidly than the speed of the wheels or than the increase in the coefficient of friction, and in a different ratio, it is necessary to provide other means for regulating the brake pressure as the wheels slow down and stop. The above-described apparatus is designed to do this and when properly adjusted will automatically so regulate the brake pressure that the frictional resistance between the rubbing surfaces of the brake will be practically uniform during the entire time the brake is applied and until released by the operator.

The entire release of the brakes is effected by operation of the release magnet 24, whose armature moves the lever 23 and unseats the valve 22. This magnet is energized by an electric circuit, which is established when the operator or motorman reversing the brake-controller brings the same back of its original starting position into the position shown in Fig. 8, when not only is the circuit reëstablished between the main line and the car motor-controller, but connection is made from the motor controller by conductor $T^2$ contacts 29, by a suitable top connection to a contact 25, and thence by a conductor 26 through the release magnet 24 and conductor $G'$ to ground. The air pressure on the piston being thus relieved, the usual release spring restores the brake-shoes and brake-mechanism to their original positions. This release having been effected, a slight forward motion of the brake-controller will bring the contacts into the position shown in Fig. 7, so as to interrupt the circuit through the release-magnet 24 without, however, interrupting the connection of the car-motor-controller with the line. Other means for operating the valve may be employed.

In Fig. 9, I show the brake-controller in the position which it occupies when the brake-magnet is energized by current derived from the line circuit, or other source not supplied by the car-motor. The trolley current is connected directly to one of the contacts 29 of the brake controller by a conductor $T^2$ a conductor $f^5$ to the switch 9, and when this switch is in the position shown in Fig. 5, i. e. before it had been turned by operation of the magnet 7, it connects the conductor $f^5$ with a conductor $f^6$ leading to the magnet 6. At the controller 3 the conductor $f^5$ is interrupted, and the separated contact-pieces 27 are adapted to be connected by a switch-plate 28 when the controller 3 is moved so far as to interrupt the circuit between the contacts $a^2$ and $b^3$, and to interrupt the circuit at 4 and $f^7$. If it is desired to apply the brake when the car is at a stand-still on a grade, or if for any reason the motor-generator should fail to act in supplying current to the brake-magnet, the motorman moves the brake-controller into the position shown in Fig. 9, and thus establishes a circuit from the line through the conductors $f^5$, $f^6$, brake-magnet 6, and to ground through conductors $M^2$ and G, which are then connected by the switch 9. The brake-magnet is thus energized and the car stopped. The resistance-coils R, controlled by the controller of the car-motor may be used to regulate the current so supplied.

The advantages of my invention will be appreciated by those skilled in the art.

The apparatus is very efficient in its operation and gives to the motorman the best possible control over the stopping of the car under all conditions of running.

I claim:—

1. In a car brake, the combination of an electro-magnetic brake-actuating motor, having a normally open circuit, a generator driven by motion of the car for generating current for the brake motor, and a switch having an electro-magnetic operative device in said generator circuit, said switch being arranged to close the circuit of the brake-actuating motor and to put the same in series with the generator when sufficient current is generated; substantially as described.

2. In a car brake, the combination of an electro-magnetic brake-actuating motor, a generator driven by motion of the car for generating current therefor, a switch which normally disconnects the brake-actuating motor from the circuit of said current-generator, and an electro-magnetic operating device adapted to operate said switch to include said brake-actuating motor in the circuit when sufficient current is generated; substantially as described.

3. In a car brake, the combination of an electro-magnetic brake-actuating motor, a generator driven by motion of the car for generating current, a switch which normally disconnects the resistance from the circuit of said current generator, and an electro-magnetic operating device constantly included in the generator circuit adapted to operate said switch to include said resistance in the circuit when sufficient current is generated; substantially as described.

4. In an electric brake, a brake controller included in the circuit between the source of power and the car motors when the brake controller is put off, and arranged to open said circuit and close a circuit between said source of power and the brake motor and reverse the terminals of the car motor when put on, in combination with an automatic switch arranged to open the circuit between the source of power and the brake motor and arranged to include the car motor in the brake motor circuit as soon as said car motor or motors build up and generate current; substantially as described.

5. In a car brake, the combination with a car and brake mechanism therefor, of means for actuating said brake mechanism and mechanism independent of said means arranged to automatically regulate the brake pressure to conform substantially to the variation in the coefficient of friction as the speed varies, and to retain part of said pressure after the car is stopped, whereby the retarding effect is maintained substantially uniform as the car slows down and stops and the car is held after it has stopped; substantially as described.

6. In a car brake, the combination of a power generator in which the output of power is controlled by the speed of the car wheel, mechanism operated by the power from said generator for retarding the movement of the car, and means independent of said generator for automatically regulating the brake pressure to conform substantially to the variation in the coefficient of friction between the friction surface as the speed varies, and to retain a part of said pressure after the car is stopped, whereby the retarding effect is maintained substantially uniform as the car slows down, and the car is held after it is stopped; substantially as described.

7. In a car brake the combination with the car and brake mechanism therefor, of means for automatically varying the brake pressure to conform substantially to the variation in the co-efficient of friction between the friction surfaces as the speed varies whereby the retarding effect is maintained substantially uniform and a spring or cushion independent of the brake actuating mechanism arranged to retain the pressure upon the brakes as the car approaches a stand still and after it has stopped, substantially as described.

8. In a car brake, the combination with the car and brake mechanism therefor, of means for automatically varying the brake pressure to conform substantially to the variation in the co-efficient of friction between the friction surfaces as the speed varies whereby the retarding effect is maintained substantially uniform, a spring or cushion independent of the brake actuating mechanism arranged to retain the presssure upon the brakes as the car approaches a stand still and after it has stopped, and means for releasing said spring or cushion, substantially as described.

9. A vehicle brake having its power controlled by the speed of one or more of the wheels thereof, in combination with automatic yielding mechanism for holding said vehicle from moving when stopped until the operator releases the brake, for the purposes substantially as specified.

10. The combination with a car brake and a generator adapted to supply power for operating the brake, whose force is greatest when the speed of the car wheels is greatest, of automatic means for preventing undue decrease in the braking pressure as the speed of the car diminishes; substantially as described.

11. The combination with a car brake and a generator adapted to supply power for operating the brake whose force is greatest when the speed of the car wheels is greatest and which diminishes in intensity with the speed of the car, of automatic yielding mechanism for causing said power to be exerted after the car has come to rest; substantially as described.

12. The combination of a combined pneumatic and hydraulic cylinder and piston with car-brake mechanism, said piston being connected with and operated by said car-brake mechanism for holding the said brakes partly set after the actuating force has been removed; substantially as described.

13. In a car brake, the combination of means for operating said brake, and mechanism for holding said brake, said mechanism being arranged to automatically permit the brake to release to a certain determined amount and hold said brake in this partly released position after the actuating power has ceased to act; substantially as described.

14. In a car-brake, the combination of means for operating said brake, mechanism for holding said brake arranged to automatically permit the brake to partly release and hold said brake in this partly set position after the actuating power has ceased to act, and means for releasing said holding mechanism to permit the car or train to be started at the will of the operator, substantially as described.

15. In a car brake, the combination of an electric motor, the armature of which is mechanically connected with the car axle or wheels, electro-magnetic brake mechanism, a secondary electro-magnet, means for short-circuiting said motor through the coil of said secondary magnet, and an electric switch mechanically connected with said secondary magnet and electrically connected with said motor and said electro-magnetic brake-mechanism; substantially as described.

16. A car brake actuating mechanism arranged to apply brakes with a pressure which is greatest when the speed of the car wheels is greatest, and is reduced when such speed is reduced, in combination with means for checking the decrease of braking pressure, as the speed of the car diminishes; substantially as described.

17. The combination with brake actuating mechanism, of means for supplying power thereto arranged to supply the greatest pressure when the speed of the car wheel is greatest, and to diminish the pressure when the speed of the wheels is reduced, and automatic means arranged to check the reduction of the brake pressure; substantially as described.

18. The combination with a car brake, of a generator operating the same and driven from the car wheels so as to supply power diminishing with the speed of the car wheels, a spring or cushion constituting means for retaining the pressure upon the brake as the car approaches a stand-still, and means for releasing said spring or cushion connected with the brake-controller and operated thereby; substantially as described.

19. The combination of a brake, a cylinder and piston arranged to act as an air cushioning device for holding the brake to its work after the power ceases to be applied thereto, a liquid inlet and valve, and an electro-magnet for releasing said valve; substantially as described.

20. In a car-brake, an electric motor for setting the car brakes and automatic mechanism for holding them partly set, said motor being actuated independently of the car-propelling current, in combination with mechanism actuated by said car propelling current for releasing said brakes; substantially as described.

21. In a car brake, an automatic cut out having a plurality of terminals and corresponding contact plates arranged in two or more sets, and mechanism for automatically changing the connections from one set to another; substantially as described.

22. In a car brake, an automatic cut-out, mechanism for operating said cut-out in one direction by the brake-actuating current, and means for automatically returning said cut-out to its initial position when said current ceases to flow; substantially as described.

23. A car brake, having an actuating power generator driven by the momentum of the car, and adapted thereby to furnish power diminishing in intensity as the speed of the car-wheel diminishes, and automatic means for checking the diminution of the brake pressure, whereby when the wheels cease to rotate, some pressure will still be applied upon the brake; substantially as described.

24. In a car brake; the combination of a brake-actuating electric motor, a generator driven by the car for supplying current therefor, a switch having an electro-magnetic operating device adapted when a sufficient current has been generated to establish a working circuit from said generator through said motor, an emergency switch arranged to control a circuit connecting the brake motor with the source of current for the car motor, and means arranged to interrupt and render inoperative the last named circuit when the circuit controlled by the first named switch is closed; substantially as described.

25. In an electric brake, the combination of a brake-actuating motor, a car motor, means independent of the car-motor-controller for disconnecting the car-motor from its source of current and including it in the brake-motor-circuit, and means for initially cutting out entirely the brake-motor from the car-motor-circuit in order to permit the car motor to build up and generate current; substantially as described.

26. In a brake system, the combination with the brake and means for actuating the same, of a yielding holding device arranged to automatically allow the pressure to yield a predetermined percent and maintain it at such point; substantially as described.

27. In an electric car brake, a brake controller arranged to be included in the car motor circuit between the source of power and the car motor controller and between the car motor controller and the car motors when in off-position, and to open said circuit when it is put on; substantially as described.

28. In an electric car-brake, a brake-controller arranged to be included in the car motor circuit between the source of power and the car-motor controller and between the car-motor controller and the car motors when in off position, and to open said circuits, include the car motor in the brake motor circuit and regulate the flow of current to the brake-motor when it is put on; substantially as described.

29. In a car brake, an electro-magnetic current regulator arranged to increase the resistance in circuit when the current in amperes reaches a certain predetermined flow, in combination with automatic mechanism arranged to return the regulator to its normal position, when said current dies down; substantially as described.

30. In a car brake the combination of an electro-magnet, a switch having a plurality of terminals, connections between the magnets and switch for operating the switch, and means under the control of the operator for closing an electric circuit through the coils of the said magnet; substantially as described.

31. In a car brake, a brake motor, suitable resistance therefor, a switch having a plurality of terminals arranged to close an electric circuit through said motor and to include the resistance in said circuit, an electro-magnetic operating device for said switch, and means under the control of the operator for closing an electric circuit through the coils of the magnet to operate said switch; substantially as described.

32. In a car brake, a brake actuating motor, suitable resistance therefor, an electric switch having a plurality of terminals, an electro-magnet arranged to operate the switch, and means under the control of the operator for closing an electric circuit through said magnet; substantially as described.

33. In a car brake, the combination with an electro-magnetic actuating mechanism, of an automatic yielding holding device for the brake arranged to hold the car at rest until said device is released; substantially as described.

34. In a car brake, the combination with electro-magnetic actuating mechanism therefor, of an automatic yielding holding device, and means under the control of the operator for releasing said holding device; substantially as described.

35. In an electric car brake, the combination of an electromagnet, a switch having a plurality of terminals, connected between said magnet and switch for actuating the switch, means under control of the operator for closing an electric circuit through the coils of the magnet to operate the switch, and mechanism for returning said switch to its normal position; substantially as described.

36. In a car brake, an electro-magnet connected to and arranged to operate the brake, in combination with a spring or cushion arranged to automatically retain the pressure upon said brakes; substantially as described.

37. In a car brake, the combination of an electro-magnet, a switch having a plurality of terminals, connections between the magnet and switch for operating said switch, mechanism under control of the operator for closing an electric circuit through the coils of the magnet, and mechanism arranged to automatically return said switch to its normal position; substantially as described.

38. In a car brake, a brake motor, suitable resistance therefor, a switch arranged to close an electric circuit through said motor and to include the resistance in said circuit; an electro-magnetic operating device for said switch, mechanism under control of the operator for closing an electric circuit through the coils of said magnet to operate the switch, and mechanism arranged to automatically return the switch to its normal position; substantially as described.

39. In a car brake, a brake actuating motor, suitable resistance therefor, an electric switch arranged to include said resistance in the circuit of the brake-actuating motor, an electro magnet for operating said switch, mechanism under control of the operator for closing an electric circuit through the coils of the magnet, and mechanism for automatically returning the switch to its normal position; substantially as described.

40. In a car brake, a generator actuated by the movement of the car, a circuit therefor, an electro-magnetic brake-actuating mechanism having suitable resistance, and an automatic switch arranged to include said resistance in the circuit when the flow of current reaches a predetermined amount, and to automatically cut out resistance as the current is lowered; substantially as described.

41. In a car brake, the combination of a car motor, a source of power therefor, brake actuating mechanism, a mechanical holding device, and mechanism under the control of the operator for causing said motors to generate current for operating said brake actuating mechanism, or causing said brake actuating mechanism to be actuated from said source of power; substantially as described.

42. In a car brake, the combination with a brake-actuating mechanism, means for furnishing power to said mechanism in a predetermined ratio to the variation of the speed of the car wheels, and automatic mechanism arranged to partially release the brake as the power is reduced, and then hold the brake in such partially released position; substantially as described.

43. In a car brake, the combination of brake-actuating mechanism, means for furnishing power thereto, which varies in a predetermined ratio to the variation of the speed of the car wheels, automatic mechanism arranged to allow the brakes to partially release as the power is reduced, and then hold the brakes in this partly released position, and mechanism under the control of the operator controlling the full release of said brakes; substantially as described.

44. In a car brake, the combination with the car motor, of a controlling switch arranged to cut said motors off from their source of power and connect them up as generators, brake actuating mechanism, an automatic locking or holding device therefor, and an automatic switch in the circuit of said motor generators; substantially as described.

45. In a car brake, the combination of a generator arranged to be driven by the momentum of the car, brake actuating mechanism, an automatic holding or locking device, and an automatic switch; substantially as described.

46. A car brake having an actuating power-generator arranged to furnish power of diminishing intensity as the speed of the car wheels diminishes, automatic mechanism for holding the brakes to their work after said power ceases to act, and means for releasing said holding mechanism by the car propelling current independently of said generator; substantially as described.

47. In a car brake the combination of motors for propelling the car, a source of power therefor, brake actuating mechanism arranged to be actuated by power generated by said car motor, automatic holding mechanism for retaining the brake pressure as the car slows down and stops, and means for releasing said holding mechanism by the car propelling power; substantially as described.

48. In an electric brake, the combination of brake actuating mechanism arranged to be actuated by current generated by the vehicle propelling motors, automatic means for retaining the brake pressure as the car slows down and stops, and mechanism for releasing said brakes and arranged to be operated by the vehicle propelling current; substantially as described.

49. In an electric brake, the combination of a source of power for the car giving a substantially uniform car propelling current, electro-magnetic brake actuating mechanism, means for furnishing actuating current to said brake actuating mechanism which varies in energy when the speed of the car varies, automatic means for retaining the retarding action of the brake as the car slows down and after it has stopped, and means for releasing said brake by the said car propelling current; substantially as described.

50. In a car brake a positive locking device in combination with an elastic connection, constructed to yield when the brake actuating force is diminished substantially for the purpose specified.

51. A brake actuating motor arranged to give a maximum brake pressure coincident with the maximum speed of the car and to automatically reduce said brake pressure when said speed reduces, in combination with a positive locking device for the brake and a yielding connection between said locking device and said brake; substantially as described.

52. In a car brake, the combination of brake actuating mechanism, means for furnishing power to said actuating mechanism arranged to automatically vary said power in response to the variation in the speed of the car wheels, and automatic holding mechanism arranged to permit the brakes to release a certain predetermined amount and then hold said brake in this partly released position; substantially as described.

53. In a car brake the combination of brake actuating mechanism, means for furnishing power to said actuating mechanism arranged to automatically vary said power in response to the variation in the speed of the car wheels, automatic holding mechanism arranged to permit the brakes to release a certain predetermined amount and then hold said brake in this partly released position, and means under the control of the operator for releasing said holding mechanism; substantially as described.

54. In an electric brake, means for diminishing the brake actuating current in combination with brake mechanism constructed to be actuated by said current to partly release as the car slows down and automatically hold the brakes in this partly set position after the car has stopped; substantially as described.

55. In a car brake the combination of a generator, the maximum output of power from which is coincident with the maximum speed of the car wheels and diminishes when said speed diminishes, an automatic switch in the circuit of said generator, brake actuating mechanism arranged to be operated by power from said generator, and automatically holding mechanism constructed to hold the brakes to their work after said power has ceased; substantially as described.

56. In an electric brake, the combination with the car motor, of means under the control of the operator for converting said motor into a generator, a circuit for said generator, an electro magnet constantly included in said circuit, electro-magnetic brake actuating mechanism, suitable resistances therefor, and a switch operated by said magnet arranged to automatically include said brake actuating mechanism and said resistance in said circuit when the flow of current from said generator reached a predetermined amount and automatically cut out said resistances when said current dies down; substantially as described.

57. In a car brake, a generator arranged to be actuated by the movement of the car, a circuit therefor, electro-magnetic brake actuating mechanism, suitable resistances therefor and an automatic switch arranged to short circuit said generator in its normal position, include the said resistances in said circuit when moved by the flow of current from said generator, and cut said resistance out of said circuit when said current dies down and said switch moves back; substantially as described.

58. In a car brake the combination of a generator driven by the movement of the car, a circuit therefor, an electro-magnet constantly included in said circuit, electro-magnetic brake actuating mechanism, suitable resistances therefor, an automatic switch arranged to be operated in one direction by said magnet to cut said resistances into said circuit when said generator is furnishing sufficient current thereto, and a spring arranged to operate the switch in the opposite direction to cut out resistance when said current dies down; substantially as described.

59. The combination of a generator having a variable speed, a circuit therefor, an automatic switch, and electrical resistances connected therewith, said switch being arranged to short circuit said generator when in its normal position, include said resistances in said circuit when moved by the current from said generator, and automatically cut resistance out of said circuit when said current dies down; substantially as described.

60. In a car brake the combination of a generator driven by the car wheels, a circuit therefor, electrical resistances, and an automatic switch arranged to short circuit said generator when in its normal position, automatically include the resistances in said circuit when sufficient current is generated by said generator, and automatically cut out resistance from said circuit when said current dies down; substantially as described.

61. In a car brake the combination of a generator, a circuit therefor, an electro magnet constantly included in said circuit, a brake actuating motor, regulating resistances therefor and a switch actuated by said magnet, arranged to automatically include said resistances in said circuit when sufficient current is generated, and automatically cut resistance out of said circuit when said current dies down; substantially as described.

62. In a car brake the combination with the car motors, of a local circuit therefor, a brake actuating motor, suitable resistances therefor, and one automatic switch constantly included in said local circuit and arranged to automatically control the relation of said resistance to said local circuit and said brake motor; substantially as described.

63. In a car brake, an actuating motor, suitable resistances therefor, an electric switch having a plurality of terminals, an electro-magnet arranged to operate said switch, mechanism under the control of the operator for closing an electric circuit through said magnet, and means independent of the operator for returning said switch to its normal position; substantially as described.

64. In a car brake the combination with the car motors, of a local circuit therefor, a brake actuating motor, suitable resistances therefor, an electro-magnet constantly included in said local circuit, a switch constructed to be operated in one direction by said magnet, a spring for operating said switch in the opposite direction, and means under the control of the operator for short circuiting said motors through said magnet; substantially as described.

65. In a car brake the combination with the car motors, of a local circuit therefor, a brake actuating motor, suitable resistances therefor, an automatic switch constantly included in said local circuit, and means under the control of the operator for short circuiting said motors through the magnet of said automatic switch; substantially as described.

66. In a car brake the combination of the car motors, a local circuit therefor, a brake actuating motor, suitable resistances therefor, an electro magnet constantly included in said local circuit, an electric switch arranged to include said resistance in said local circuit when actuated, connections between said magnet and said switch for actuating said switch, and a controlling switch under the control of the operator arranged to close said local circuit through said magnet when thrown on; substantially as described.

67. In a car brake, a generator arranged to be driven by the momentum of the car or train, a circuit therefor, electro-magnetic brake actuating mechanism and suitable resistances therefor, and an automatic switch arranged to include said resistances in said circuit when sufficient current of sufficient energy is generated, and to automatically cut resistance out of said circuit when said current dies down; substantially as described.

68. In an electric brake, the combination of a controlling switch under the control of the operator arranged to change the motor connections when thrown on, so as to cause the motors to act as generators, electromagnetic brake actuating mechanism, regulating resistances therefor, and one automatic switch arranged to short circuit said motor generators when in its normal position, include said brake actuating mechanism and the said resistances in the circuit of said generators when current of sufficient energy is generated, and automatically cut resistance out of said circuit when said current dies down; substantially as described.

69. In an electric brake the combination of electro-magnetic brake actuating mechanism arranged to be operated by current generated by the car motors, automatic mechanism for retaining the brake pressure after said current ceases to flow, and means operated by the car propelling current for releasing said brakes; substantially as described.

70. The combination, on an electrically operated car, of a running controller, and a braking controller, independent of the running controller, which is adapted to connect the motor, or motors, in braking circuit and to apply and control the brakes, when the running controller is in any position.

71. The combination, on an electrically operated car, of a motor, a running controller for the motor, a local braking circuit and a braking controller adapted by one movement to connect the motor to act as a generator without moving the running controller whatever its position may be and by a further movement to vary the resistance in the braking circuit.

72. The combination, on an electrically operated car, of a motor, a running controller, a reversing switch, a local braking circuit, and a braking controller adapted by one movement to connect the motor to act as a generator in the braking circuit and to apply the brakes whatever may be the position of the running controller, and adapted by a further movement to vary the resistance in the braking circuit.

73. A car brake having an actuating power generator driven by momentum of the car and adapted to furnish power diminishing in intensity as the speed of the car diminishes and automatic means for regulating the brake pressure relatively to the speed of the car.

74. A car brake having an actuating power generator driven by momentum of the car and adapted to furnish power diminishing in intensity as the speed of the car diminishes, automatic means for varying the braking pressure relatively to the speed of the car and means, under the control of the motorman, by which he may, at will, maintain a maximum constant or some lesser constant rate of retardation.

75. The combination, on an electrically-operated car, of a motor, or motors, a running controller for the motor, or motors, and a brake-switch adapted to connect the motor, or motors, to act as generators in a local braking-circuit so as to apply the brakes whatever the position of the controller may be.

76. The combination, on an electrically-operated car, of a motor, or motors, a running controller, a reversing-switch and a brake-switch adapted by a single movement to connect the motor, or motors, to act as generators in a local braking-circuit so as to apply the brakes whatever the position of the controller.

77. The combination, on an electrically-operated car, of a motor, a running controller, a reversing-switch and a brake-switch adapted to connect the motor to act as a generator in a local braking-circuit so as to apply the brakes when the running controller is in the open position.

78. The combination, on an electrically-operated car, of a motor, a running controller, a reversing-switch for reversing the motor, and a brake-switch adapted to connect the motor to act as a generator in a local braking-circuit when the controller is in any position.

79. The combination, on an electrically-operated car, of a motor, a running controller and a braking-switch adapted to connect the motor to act as a generator in a local braking-circuit and to cut out the running controller from the local braking-circuit.

80. The combination, on an electrically-operated car, of a motor, a running controller, a reversing-switch, and a brake-switch adapted to connect the motor to act as a generator in a local braking-circuit when the controller is in any position.

In testimony whereof, I have hereunto set my hand.

MOSES G. HUBBARD, Jr.

Witnesses:
G. I. HOLDSHIP,
THOMAS W. BAKEWELL.